US005192632A

United States Patent [19]

Ohmura et al.

[11] Patent Number: 5,192,632

[45] Date of Patent: Mar. 9, 1993

[54] ELECTROPHOTOGRAPHIC BISAZO PHOTOSENSITIVE MEMBER, AND ELECTROPHOTOGRAPHIC APPARATUS AND FACSIMILE EMPLOYING THE SAME

[75] Inventors: Satomi Ohmura, Kawasaki; Yoshio Kashizaki, Yokohama, both of Japan

[73] Assignee: Canon Kabushiki Kaisha, Tokyo, Japan

[21] Appl. No.: 737,015

[22] Filed: Jul. 29, 1991

[30] Foreign Application Priority Data

Jul. 30, 1990 [JP] Japan .................................. 2-199308

[51] Int. Cl.$^5$ .......................... G03G 5/06; G03G 5/09; G03G 15/00; H04N 1/23

[52] U.S. Cl. ........................................ 430/58; 430/59; 430/71; 430/72; 430/75; 430/76; 430/78; 430/79; 430/83; 355/211; 358/300

[58] Field of Search ........................ 430/58, 59, 71, 72, 430/75, 76, 78, 79, 83

[56] References Cited

U.S. PATENT DOCUMENTS 4,666,805 5/1987 Hashimoto ........................ 430/71 X
4,708,921 11/1987 Hashimoto ........................ 430/72 X

FOREIGN PATENT DOCUMENTS 54-22834 2/1979 Japan .
58-70232 4/1983 Japan .
60-131539 7/1985 Japan .
61-215556 9/1986 Japan .
61-241763 10/1986 Japan .
61258 3/1988 Japan .................................... 430/78
64050 3/1988 Japan .................................... 430/72
68843 3/1988 Japan .................................... 430/78
63-158561 7/1988 Japan .
2-118581 5/1990 Japan .

*Primary Examiner*—Roland Martin
*Attorney, Agent, or Firm*—Fitzpatrick, Cella, Harper & Scinto

[57] ABSTRACT

An electrophotographic photosensitive member has an electroconductive support and a photosensitive layer formed thereon. The photosensitive layer contains a compound represented by the general formula (1) below:

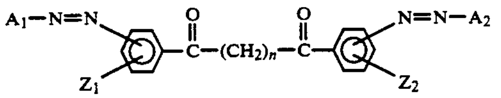

(1)

wherein $Z_1$ and $Z_2$ are each independently a hydrogen atom, an alkyl group, a halogen atom, an alkoxy group, a nitro group, a cyano group, or a trifluoromethyl group; $A_1$ and $A_2$ are each a coupler residue having a phenolic hydroxyl group, which may be the same or different; and n is an integer of 1 or 2.

19 Claims, 1 Drawing Sheet

ELECTROPHOTOGRAPHIC BISAZO PHOTOSENSITIVE MEMBER, AND ELECTROPHOTOGRAPHIC APPARATUS AND FACSIMILE EMPLOYING THE SAME

BACKGROUND OF THE INVENTION

1. Field of the Invention

The present invention relates to an electrophotographic photosensitive member, more particularly to an electrophotographic photosensitive member comprising a photosensitive layer containing a disazo pigment having a specified chemical structure. The present invention also relates to an electrophotographic apparatus and a facsimile employing the photosensitive member.

2. Related Background Art

Known organic photoconductive substances used for electrophotographic photosensitive members include photoconductive polymers typified by poly-N-vinylcarbazole, low-molecular organic photoconductive substances like 2,5-bis(p-diethylaminophenyl)-1 3,4-oxadiazole, and combinations of such an organic photoconductive substance with a dye or a pigment.

Electrophotographic photosensitive members employing an organic photoconductive substance have advantages that the photoconductive members are producible at high productivity at a relatively low cost, and that the color sensitivity thereof is arbitrarily controlled by selecting the dye or the pigment to be used. Therefore, organic photoconductive substances have comprehensively been investigated. Recently, function-separation types of photosensitive members have been developed which have lamination structure comprising layers of a charge-generating layer containing an organic photoconductive dye or pigment and a charge-transporting layer containing aforementioned photoconductive polymer or a low-molecular organic electroconductive substance, whereby the disadvantage of conventional organic electrophotographic photosensitive members such as low sensitivity and low durability have been remarkably alleviated.

Among organic photoconductive substances, many azo pigments have superior photoconductivity generally. Moreover, selection of combinations of an azo component and a coupler component readily gives various properties of the compound. Accordingly, many compounds have been disclosed as organic photoconductive substances, for example, in Japanese Patent Application Laid-Open Nos. 54-22834, 58-70232, 60-131539, 61-21556, 61-241763, 63-158561, etc.

Recently, with demand for higher picture quality, an electrophotographic photosensitive member are being investigated which have a higher sensitivity, and better electrophotographic characteristics even in repeated use.

SUMMARY OF THE INVENTION

An object of the present invention is to provide an electrophotographic photosensitive member comprising a photosensitive layer containing a novel photoconductive material.

Another object of the present invention is to provide an electrophotographic photosensitive member having high sensitivity and stable potential characteristics particularly in repeated use.

A still another object of the present invention is to provide an electrophotographic apparatus employing the above-mentioned electrophotographic photosensitive member.

A further object of the present invention is to provide a facsimile apparatus employing the above-mentioned electrophotographic photosensitive member.

According to an aspect of the present invention, there is provided an electrophotographic photosensitive member comprising an electroconductive support and a photosensitive layer formed thereon, the photosensitive layer containing a compound represented by the general formula (1) below:

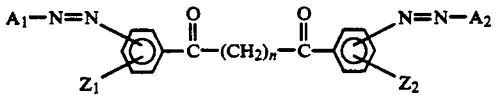

(I)

wherein $Z_1$ and $Z_2$ are each independently a hydrogen atom, an alkyl group, a halogen atom, an alkoxy group, a nitro group, a cyano group, or a trifluoromethyl group, $A_1$ and $A_2$ are each independently a coupler residue having a phenolic hydroxyl group, which may be the same or different; and n is an integer of 1 or 2.

According to another aspect of the present invention, there is provided an electrophotographic apparatus employing the electrophotographic photosensitive member specified above.

According to still another aspect of the present invention, there is provided a facsimile apparatus employing the electrophotographic photosensitive member specified above.

DESCRIPTION OF THE PREFERRED EMBODIMENT

Figure 1:
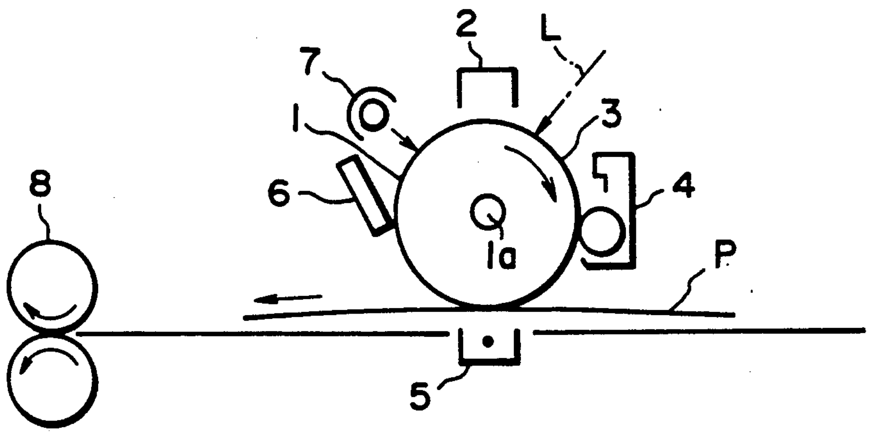
FIG. 1 illustrates outline of the constitution of an electrophotographic apparatus employing the electrophotographic photosensitive member of the present invention.

The photosensitive member of the present invention comprises an electrophotographic photosensitive layer containing a compound represented by the general formula (1) shown above.

In Formula (1), $Z_1$ and $Z_2$ represent respectively a hydrogen atom, an alkyl group, a halogen atom, an alkoxy group, a nitro group, a cyano group, or a trifluoromethyl group, specifically the alkyl group including methyl, ethyl, n-propyl, n-butyl, and the like, the halogen atom including a fluorine atom, a chlorine atom, a bromine atom, and an iodine atom, and the alkoxy group including methoxy, ethoxy, butoxy, phenoxy, and the like. $Z_1$ and $Z_2$ may be the same or different.

The symbol n in Formula (1) is an integer of 1 or 2.

$A_1$ and $A_2$ in Formula (1) are each a coupler residue having a phenolic hydroxyl group, which may be the same or different. Preferable examples of the coupler residue are shown specifically by the formulas (2) to (6).

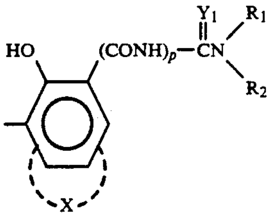
(2)

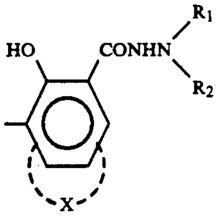
(3)

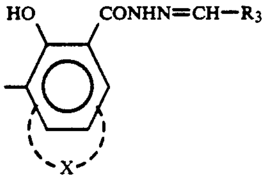
(4)

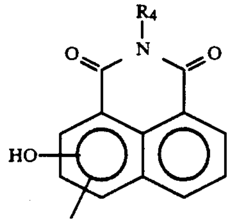
(5)

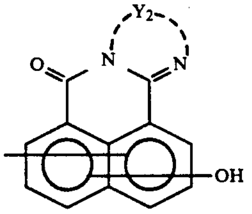
(6)

X in Formulas (2), (3), and 4) represents an atomic group necessary for forming, by condensing with the benzene ring in the formulas, a substituted or unsubstituted polycyclic aromatic or heterocyclic group such as a naphthalene ring, an anthracene ring, a carbazole ring, a benzocarbazole ring, a dibenzofuran ring, and the like.

$Y_2$ in Formula G) is a substituted or unsubstituted divalent aromatic hydrocarbon radical or a substituted or unsubstituted divalent heterocyclic group having a nitrogen atom in the ring. Specific examples are divalent groups such as o-phenylene, o-naphthylene, naphthylene, 1,2-anthrylene, 3,4 -pyrazoldiyl, 2,3-pyridindiyl, 4,5-pyridindiyl, 6,7-indazoldiyl, and 6,7-quinolindiyl.

$R_1$ and $R_2$ in Formulas (2) and (3) are respectively a hydrogen atom, an alkyl group, an aryl group, an aralkyl group, or a heterocyclic group, the group being substituted or unsubstituted. $R_1$ and $R_2$ may be linked together to form a cyclic amino group having a nitrogen in the ring thereof.

$R_3$ in Formula (4) is a hydrogen atom, an alkyl group, an aryl group, an aralkyl group, or a heterocyclic group, which may be substituted or unsubstituted.

$R_4$ in Formula (5) is a hydrogen atom, an alkyl group, an aryl group, an aralkyl group, or a heterocyclic group, the group being substituted or unsubstituted.

In the above description, The alkyl group includes methyl, ethyl, propyl, and the like; the aryl group includes phenyl, naphthyl, anthryl, and the like; the aralkyl group includes benzyl, phenethyl, and the like; the heterocyclic group includes pyridyl, thienyl, carbazolyl, benzimidazolyl, benzothiazolyl, and the like; the cyclic amino group having a nitrogen atom in the ring includes pyrrole, pyrroline, pyrrolidine, pyrrolidone, indole, indoline, carbazole, imidazole, pyrazole, pyrazoline, oxazine, phenoxazine, and the like.

The substituent includes halogen atoms such as fluorine, chlorine, iodine, and bromine; alkyl groups such as methyl, ethyl, and propyl; alkoxy groups such as methoxy, and ethoxy; alkylamino groups such as dimethylamino and diethylamino; a phenylcarbamoyl group; a nitro group; a cyano group; halomethyl groups such as trifluoromethyl: and so forth.

$Y_1$ in Formula (2) is an oxygen atom or a sulfur atom, and p is an integer of 0 or 1.

The pigments represented by Formula (1) in which $A_1$ and $A_2$ are groups represented by Formula (2), (3), or (4) and X is an atomic group for forming benzocarbazole by condensing with the benzene ring are particularly suitable for a charge generating substance for semiconductor laser because the absorption range of the pigments extends to a near-infrared region.

Typical preferable examples of the compounds represented by Formula (1) are shown below, without limiting the invention thereto.

Exemplified pigment (1)

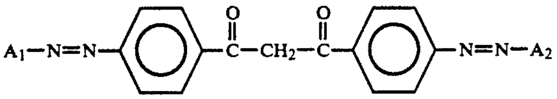

$A_1$, $A_2$:

-continued
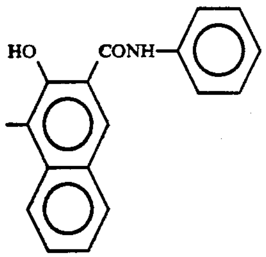
Exemplified pigment (2)
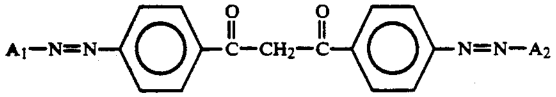
$A_1$, $A_2$:
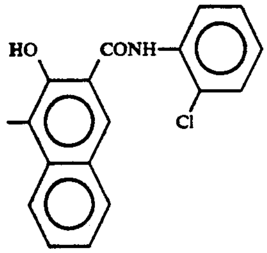
Exemplified pigment (3)
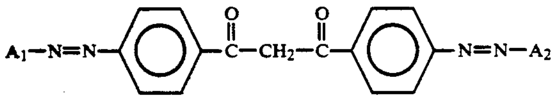
$A_1$, $A_2$:
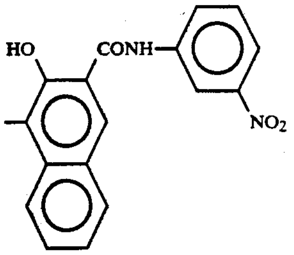
Exemplified pigment (4)
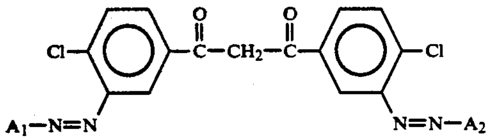
$A_1$, $A_2$:
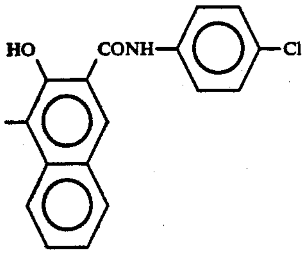
Exemplified pigment (5)

-continued
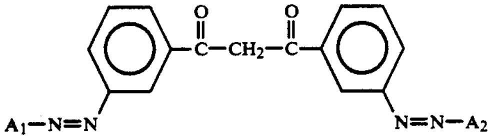
A1, A2:
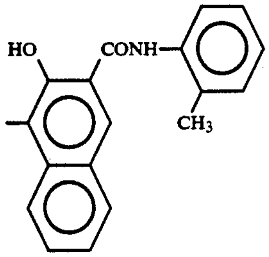
Exemplified pigment (6)
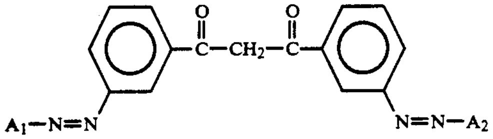
A1, A2:
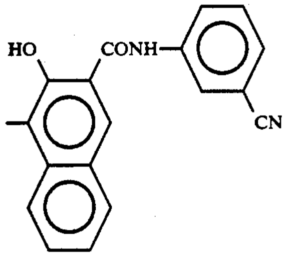
Exemplified pigment (7)
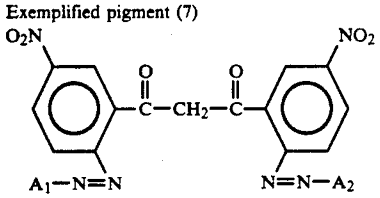
A1, A2:
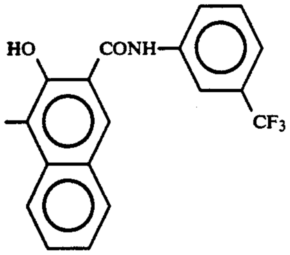
Exemplified pigment (8)
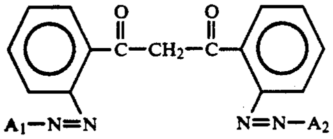
A1, A2:

-continued
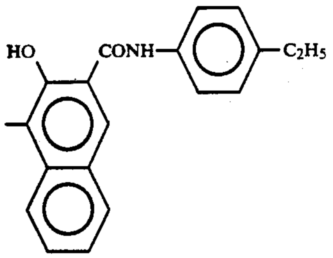
Exemplified pigment (9)
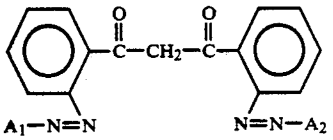
$A_1$, $A_2$:
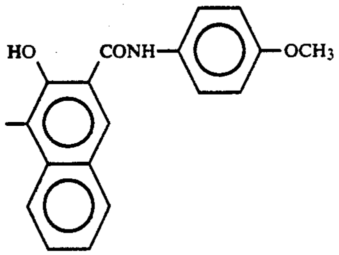
Exemplified pigment (10)
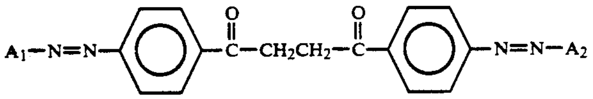
$A_1$, $A_2$:
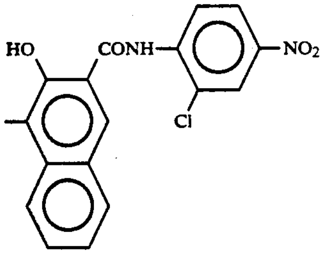
Exemplified pigment (11)
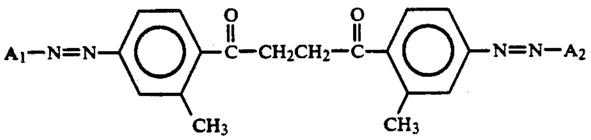
$A_1$, $A_2$:
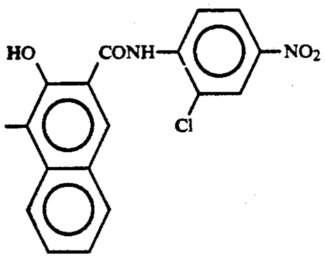
Exemplified pigment (12)

-continued
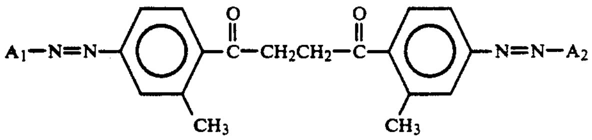
$A_1$, $A_2$:
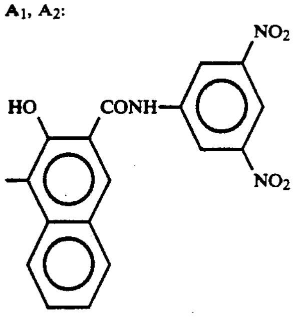
Exemplified pigment (13)
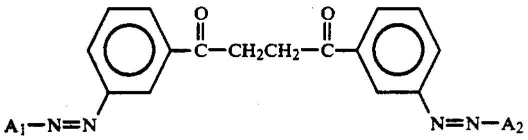
$A_1$:
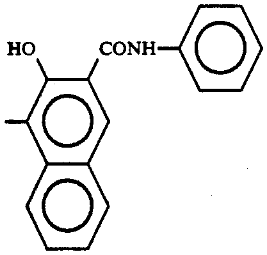
$A_2$:
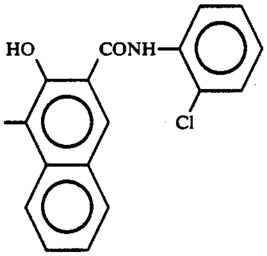
Exemplified pigment (14)
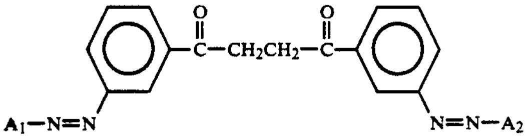
$A_1$:
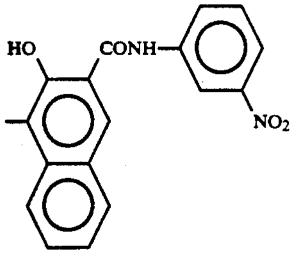
$A_2$:
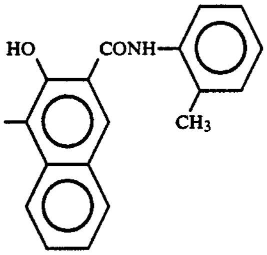
Exemplified pigment (15)
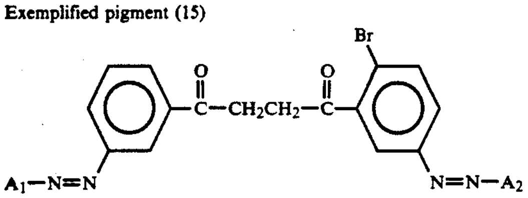
$A_1$:
$A_2$:

-continued
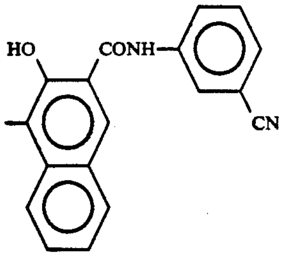
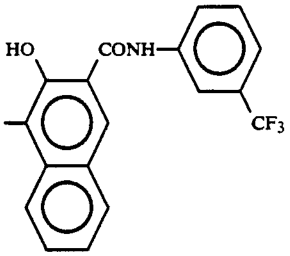
Exemplified pigment (16)
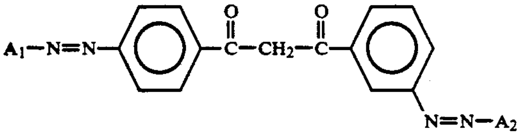
A1:
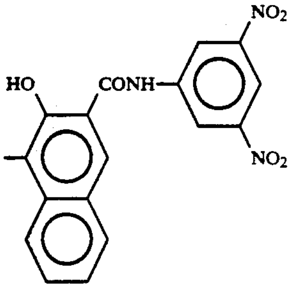
A2:
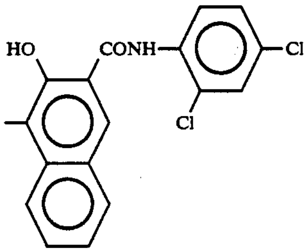
Exemplified pigment (17)
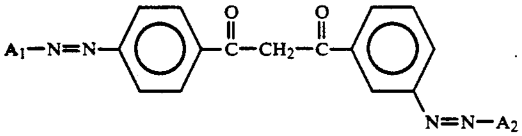
A1, A2:
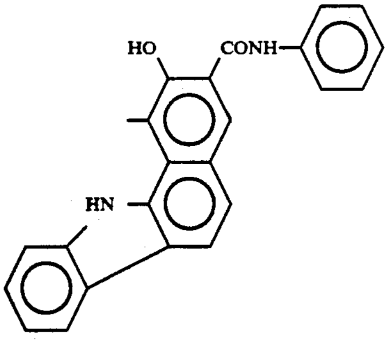
Exemplified pigment (18)
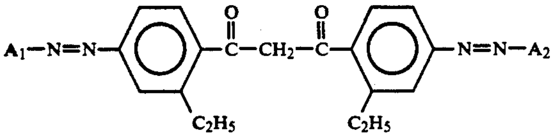
A1, A2:

-continued
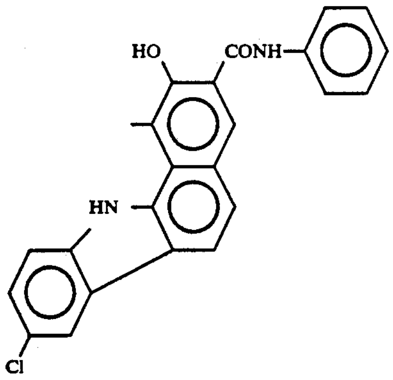
Exemplified pigment (19)
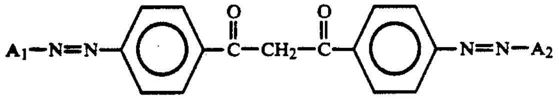
A1, A2:
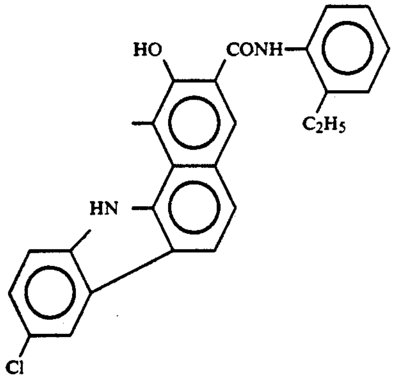
Exemplified pigment (20)
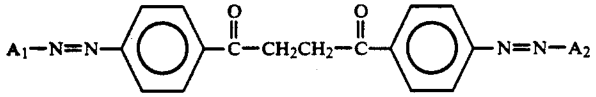
A1, A2:
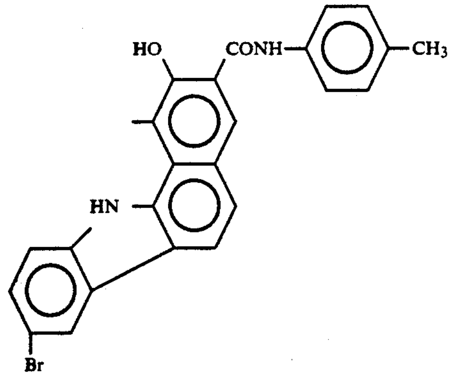
Exemplified pigment (21)
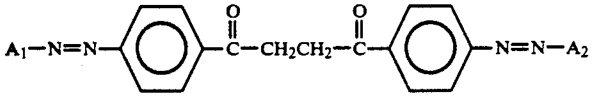
A1: A2:

-continued
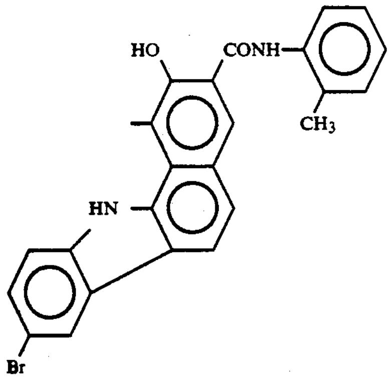
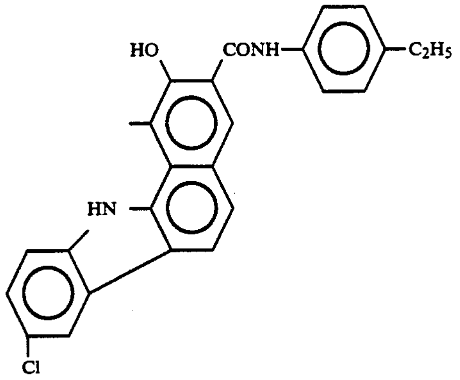
Exemplified pigment (22)
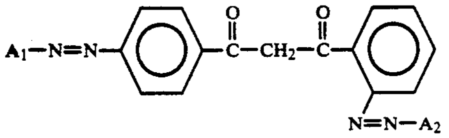
$A_1$:
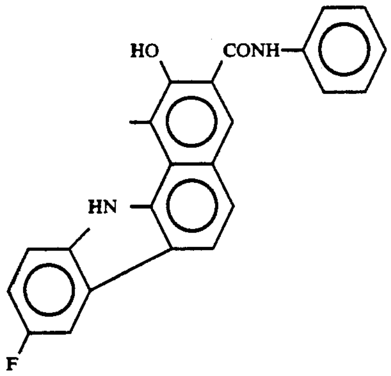
$A_2$:
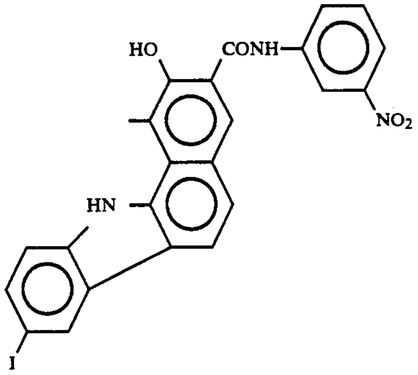
Exemplified pigment (23)
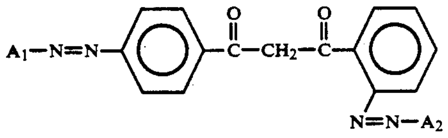
$A_1$:
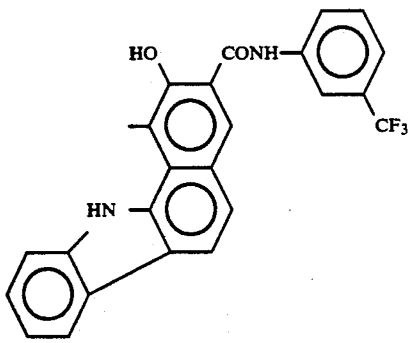
$A_2$:
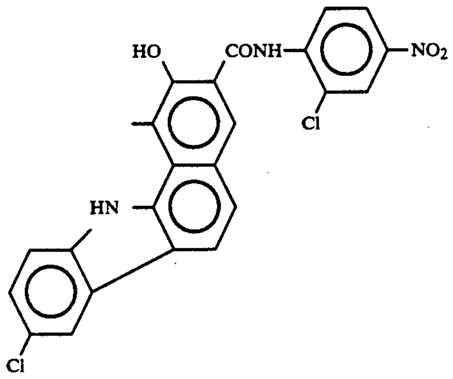
Exemplified pigment (24)

-continued
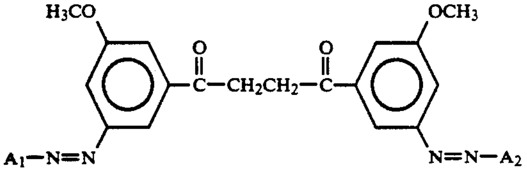
$A_1$:
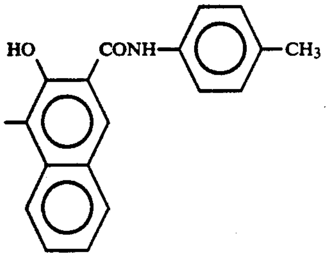
$A_2$:
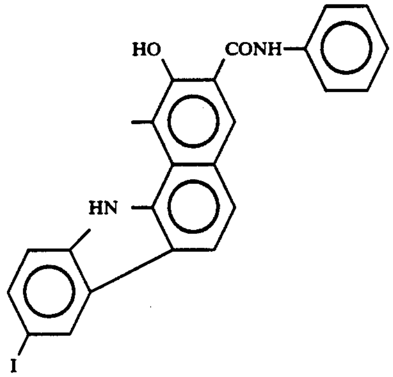
Exemplified pigment (25)
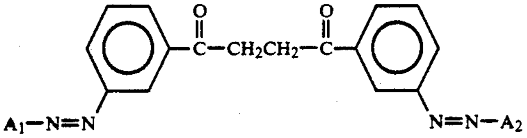
$A_1$, $A_2$:
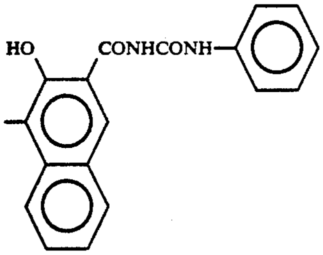
Exemplified pigment (26)
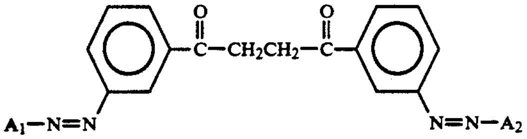
$A_1$, $A_2$:
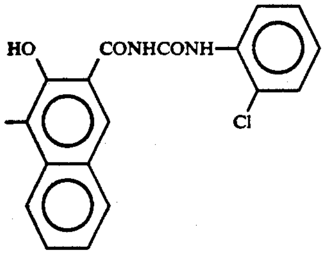
Exemplified pigment (27)

-continued
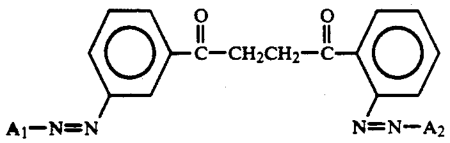
$A_1$, $A_2$:
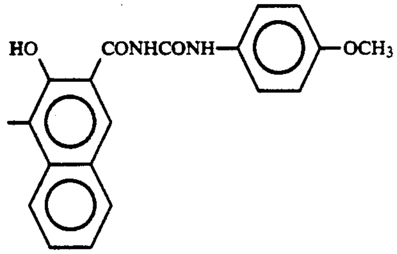
Exemplified pigment (28)
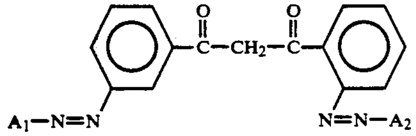
$A_1$, $A_2$:
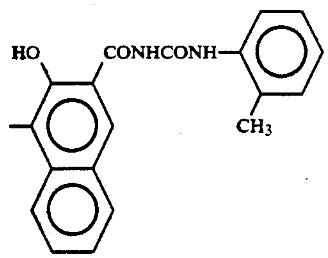
Exemplified pigment (29)
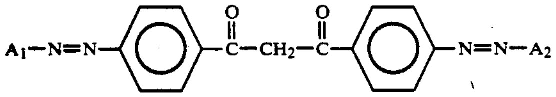
$A_1$, $A_2$:
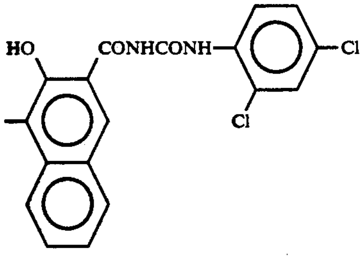
Exemplified pigment (30)
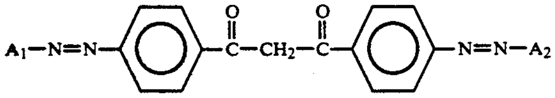
$A_1$: $A_2$:

-continued
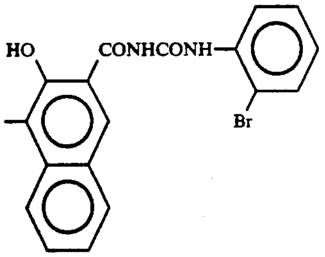
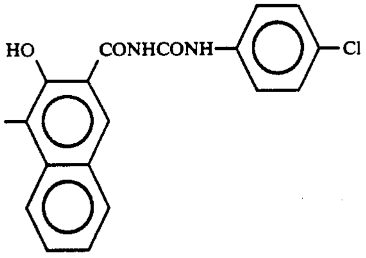
Exemplified pigment (31)
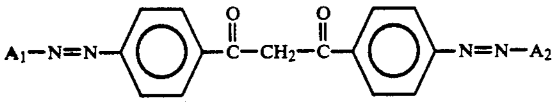
$A_1$:
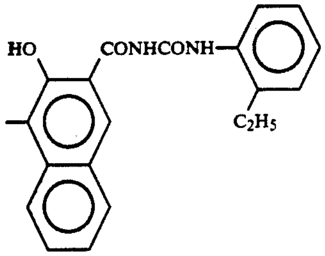
$A_2$:
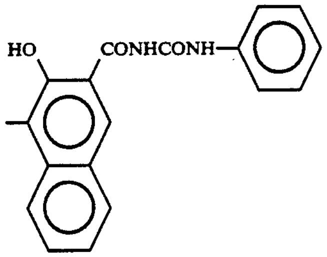
Exemplified pigment (32)
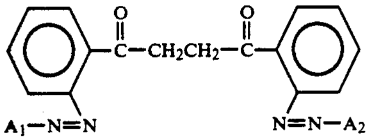
$A_1$:
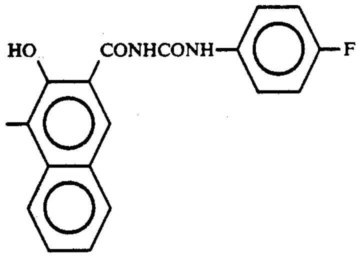
$A_2$:
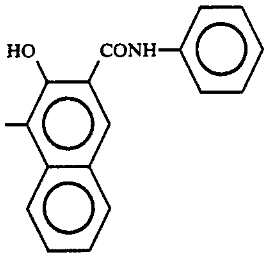
Exemplified pigment (33)
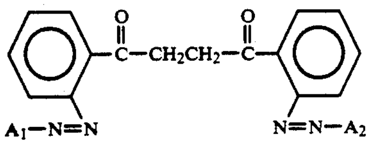
$A_1$:
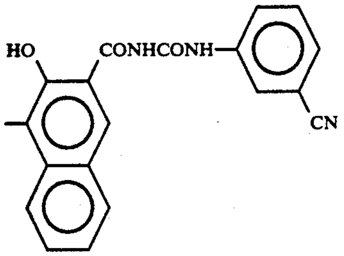
$A_2$:
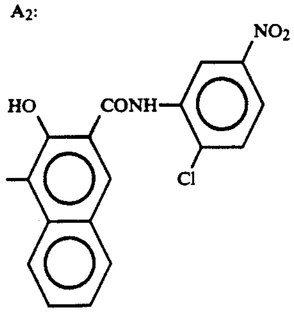

-continued
Exemplified pigment (34)
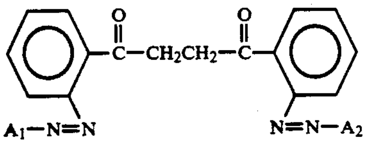
$A_1$:
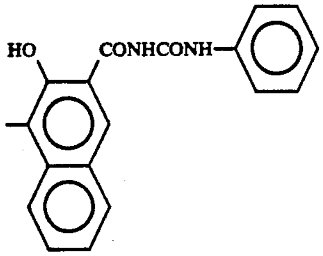
$A_2$:
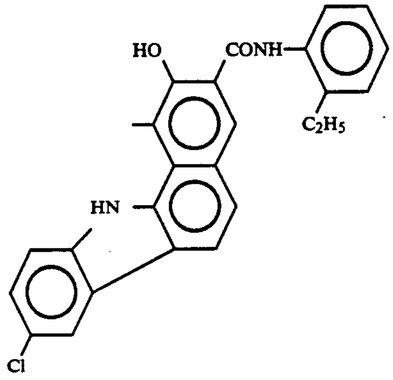
Exemplified pigment (35)
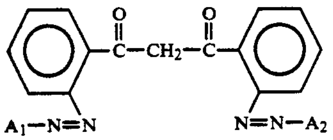
$A_1$:
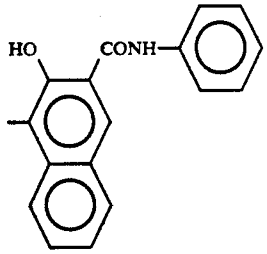
$A_2$:
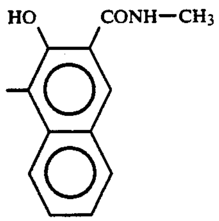
Exemplified pigment (36)
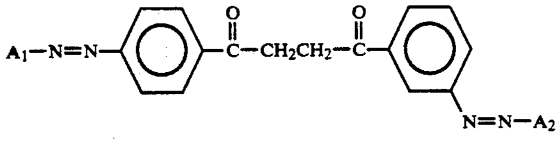
$A_1$:
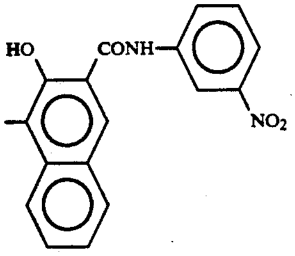
$A_2$:
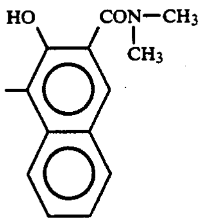
Exemplified pigment (37)

-continued
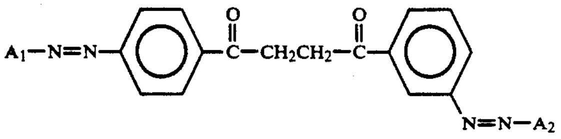
A1: A2:
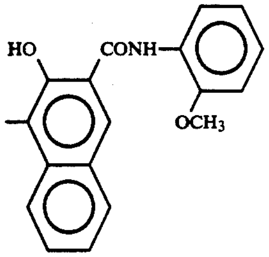
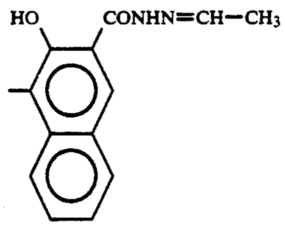
Exemplified pigment (38)
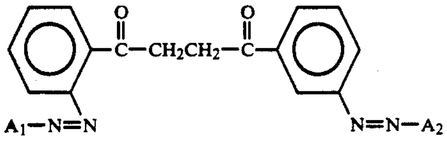
A1: A2:
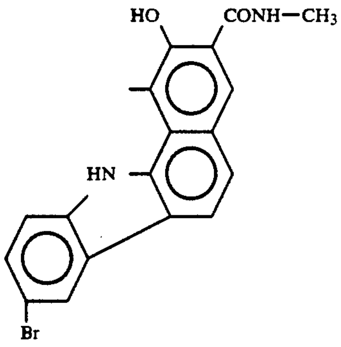
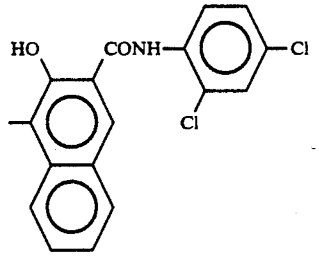
Exemplified pigment (39)
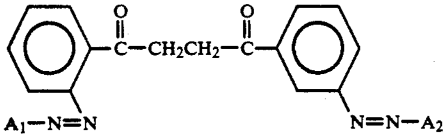
A1: A2:
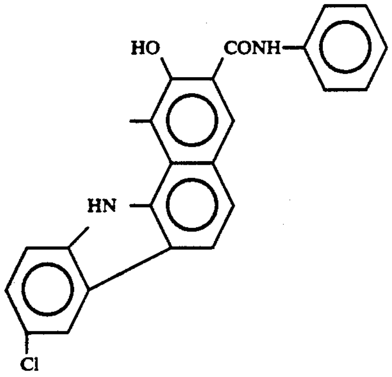
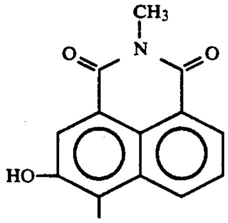
Exemplified pigment (40)

-continued
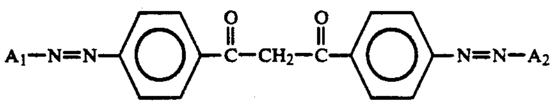
$A_1$, $A_2$:
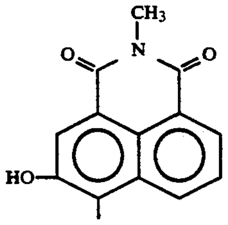
Exemplified pigment (41)
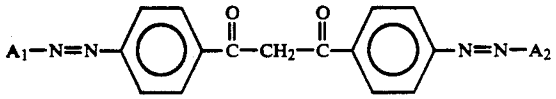
$A_1$:
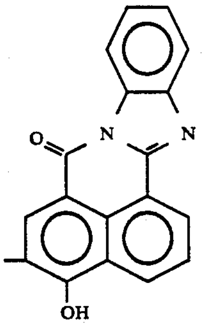
$A_2$:
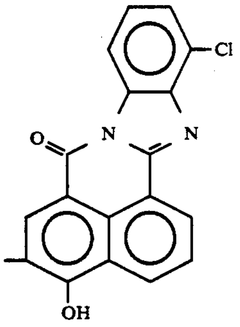
Exemplified pigment (42)
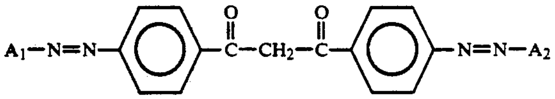
$A_1$:
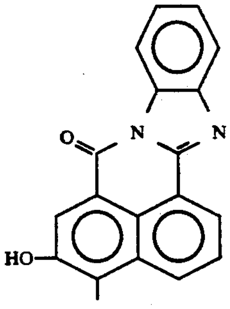
$A_2$:
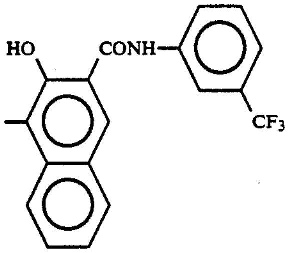
Exemplified pigment (43)
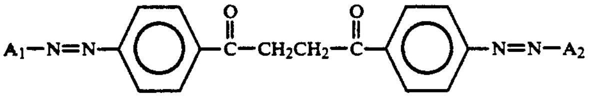
$A_1$, $A_2$:

-continued

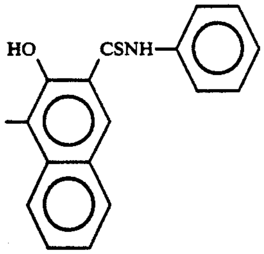

Exemplified pigment (44)

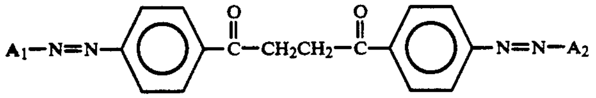

$A_1$:

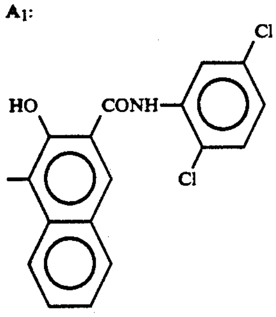

$A_2$:

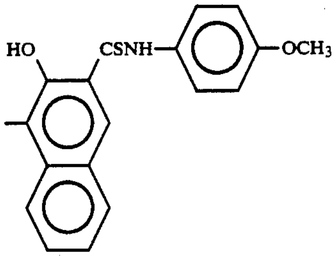

Exemplified pigment (45)

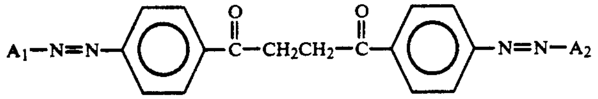

$A_1$:

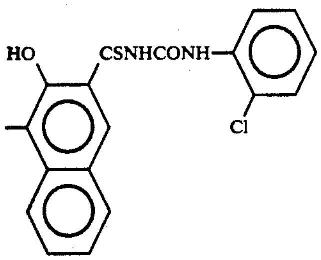

$A_2$:

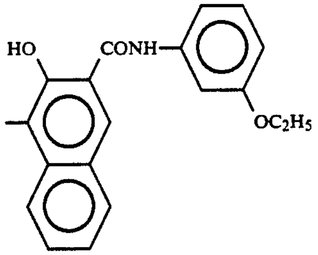

A general method for synthesis of the compound of Formula (1) is described below without limiting the synthesis method thereto.

In the case where $A_1$ and $A_2$ are identical with each other, a diamine of the formula below is used as the starting material.

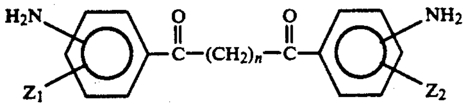

wherein $Z_1$, $Z_2$, and n are the same as those in Formula (1). The diamine is converted to a tetrazonium salt by use of sodium nitrite or nitrosylsulfuric acid according to a conventional method. Then the resulting tetrazonium salt is (a) coupled with a coupler having the structure of $A_1$ in an aqueous solution in the presence of alkali, or (b) isolated in a form of a stable salt such as a borofluoride salt or a zinc chloride double salt, and coupled with the coupler in an organic solvent such as dimethylformamide (DMF) and dimethylsulfoxide in the presence of a base such as sodium acetate, triethylamine, and N-methylmorpholine. Thereby the compound of Formula (1) is readily prepared.

In the case where $A_1$ is different from $A_2$, (a) the tetrazonium salt is coupled with an equimolar amount of a first coupler to prepare a monoazo compound and then coupled with an equimolar amount of a second coupler to give the disazo pigment, or otherwise (b) the tetrazonium salt is coupled with a mixture of the two kinds of couplers. In order to produce effectively a pigment having different $A_1$ and $A_2$ within the molecule, preferably one of the amino groups of the diamine is protected by an acetyl group or the like and then the other amino group is diazotized and coupled with one coupler, and subsequently the protected group is hydrolyzed by hydrochloric acid or the like, and diazotized again and coupled with the other coupler to give the intended pigment.

A synthesis example of the compound employed in the present invention is shown specifically below.

SYNTHESIS EXAMPLE Synthesis of Exemplified Pigment (1)

150 ml of water, 20 ml (0.23 mol) of concentrated hydrochloric acid, and 8.1 g (0.032 mol) of the compound of the formula below were placed in 300-ml beaker.

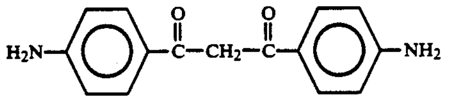

The mixture was cooled to 0° C., and thereto a solution of 4.6 g (0.067 mol) of sodium nitrite in 10 ml of water was added dropwise over 10 minutes by keeping the temperature of the liquid at 5° C. or below. After stirring the liquid for 15 minutes, the liquid was filtered with carbon. To the filtrate, a solution of 10.5 g (0.096 mol of sodium borofluoride in 90 ml of water was added dropwise with stirring. The deposited borofluoride salt was collected by filtration, washed with cold water and then with acetonitrile, and dried under a reduced pressure at room temperature. The yield was 12 g (yield rate: 83 %).

Separately, 500 ml of DMF was placed in a 1-liter beaker. Therein 11 g (0.042 mol) of the compound of the formula below:

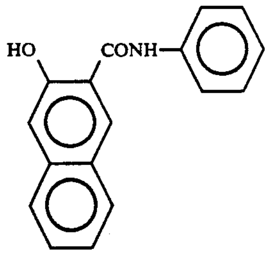

was dissolved and the solution was cooled to a temperature of 5° C. Thereto, 9.0 g (0.020 mol) of the borofluoride salt obtained above was dissolved, and 5.1 g (0.050 mol) of triethylamine was added dropwise over 5 minutes. The liquid was stirred for 2 hours, and the deposited pigment was collected by filtration, washed four times with DMF, three times with water, and freeze-dried. The yield was 12.2 g (yield rate: 76%). The result of elemental analysis of the compound was as below.

| | Calculated (%) | Found (%) |
|---|---|---|
| C | 73.3 | 73.2 |
| H | 4.0 | 4.3 |
| N | 10.5 | 10.6 |

In the present invention, the photosensitive layer, which contains the compound represented by the general formula (1), includes those of the layer constructions below. The constructions are shown with the layer order of (lower layer) / (upper layer).

1 A layer containing a charge-generating substance (charge-generating layer) / a layer containing a charge-transporting substance (charge-transporting layer), (2) A charge-transporting layer / a charge-generating layer, and (3) A layer containing a charge-generating substance and a charge-transporting substance.

Naturally the construction of the photosensitive layer of the present invention is not limited to those mentioned above.

The constructions are described below in detail.

The charge-generating layer may be formed by applying, onto an electroconductive support, a coating liquid which has been prepared by dispersing the azo pigment of Formula (1) and a binder resin in a suitable solvent. The film thickness is preferably not more than 5 μm, more preferably in the range of from 0.1 to 1 μm.

The binder resin used may be selected from a variety of insulating resins and organic photoconductive polymers. Preferred resins are polyvinylbutyrals, polyvinylbenzals, polyarylates, polycarbonates, polyesters, phenoxy resins, cellulose resins, acrylic resins, polyurethanes, and the like. The content of the binder resin in the charge-generating layer is preferably not more than 80% by weight, more preferably not more than 40% by weight.

Any solvent may be employed, provided that the solvent is capable of dissolving the above-mentioned resin. Specific examples of the solvents include ethers such as tetrahydrofuran, and 1,4-dioxane; ketones such as cyclohexanone and methyl ethyl ketone; amides such as N,N dimethylformamide; esters such as methyl acetate, and ethyl acetate; aromatic solvents such as toluene, xylene, and chlorobenzene; alcohols such as methanol, ethanol, and 2-propanol; aliphatic halogenated hydrocarbons such as chloroform, methylene chloride, dichloroethylene, carbon tetrachloride, and trichloroethylene; and the like. The solvents are preferable which do not dissolve the charge-transporting layer nor the subbing layer described later.

The azo pigment employed in the present invention may either be amorphous or be crystalline. Two or more of the azo pigments of Formula (1) may be used in combination with each other or the azo pigment may be used in combination with a known charge-generating substance, if necessary.

The charge-transporting layer may be formed inside or outside the charge-generating layer in lamination, and functions to receive charge carriers from the charge-generating layer and to transport the carriers under an electric field applied.

The charge-transporting layer may be formed by applying a solution of a charge-transporting substance and optionally a suitable binder resin in a solvent. The film thickness is preferably in the range of from 5 to 40 μm, more preferably from 15 to 30 μm.

The charge-transporting substance includes electron-transporting substances and positive hole-transporting substances. The examples of the electron-transporting substances are electron attracting substances such as 2,4,7-trinitrofluorenone, 2,4,5,7-tetranitrofluorenone, chloranil, and tetracyanoquinodimethane; and polymers of such electron-attracting substances.

The positive-hole-transporting substances include polycyclic aromatic compounds such as pyrene and anthracene; heterocyclic compounds including carbazoles, indoles, imidazoles, oxazoles, thiazoles, oxadiazoles, pyrazoles, pyrazolines, thiadiazoles, and triazoles;

hydrazone compounds such as p-diethylaminobenzaldehyde-N,N-diphenylhydrazone, and N,N-diphenylhydrazino-3-methylidene-9-ethylcarbazole; styryl compounds such as α-phenyl-4'-N,N-diphenylaminostilbene, and 5-[4-(di-p-tolylamino)benzylidene]-5H-dibenzo[a,d]cycloheptene; benzidine compounds; triarylmethane compounds; triphenylamine compounds; and the like; and polymers having a radical derived from the above compound in the main chain or the side chain thereof such as poly-N-vinylcarbazole, polyvinylanthracene, etc.

In place of these organic charge-transporting substances, inorganic materials such as selenium, selenium-tellurium, amorphous silicon, and cadmium sulfide may also be used.

Two or more of these charge-transporting substances may be used in combination.

If the charge-transporting substance does not have a film-forming property, a suitable binder may be used. The specific examples of the binder include insulating resins such as acrylic resins, polyarylates, polyesters, polycarbonates, polystyrenes, acrylonitrile-styrene copolymers, polyacrylamides, polyamides, chlorinated rubbers, and the like; and organic photoconductive polymers such as poly-N-vinylcarbazole, polyvinylanthracene, and the like.

Other specific examples of the present invention are electrophotographic photosensitive members having a single layer type photosensitive layer which contains the azo pigment of Formula (1) and a charge-transporting substance in the same one layer. In such examples, a charge-transfer complex unmentioned above such as a combination of poly-N-vinylcarbazole and trinitrofluorenone may also be used as the charge-transporting substance.

The thickness of the photosensitive layer of a single layer type is preferably in the range of from 5 to 40 μm, more preferably from 10 to 30 μm.

As a protecting layer, a simple resin layer or a resin layer containing electroconductive particles or charge-transporting substance may be provided for the purpose of protecting he photosensitive layer from harmful mechanical and chemical effects in the present invention.

A subbing layer having functions of a barrier and an adhesive may be provided between the electroconductive support and the photosensitive layer in the present invention. The subbing layer may be made of casein, polyvinyl alcohol, nitrocellulose, polyamides (such as nylon 6, nylon 66, nylon 610, a nylon copolymer, and alkoxymethylated nylon), polyurethane, aluminum oxide, and the like. The thickness of the subbing layer is preferably not more than 5 μm, more particularly in the range of from 0.1 to 3 μm.

The respective layers can be formed by using a suitable organic solvent according to a coating method such as immersion coating, spray coating, beam coating, roller coating, Meyer bar coating, and blade coating.

The electroconductive support may be made of such a material like aluminum, aluminum alloy, copper, zinc, stainless steel, vanadium, molybdenum, chromium, titanium, nickel, indium, gold, and platinum. Further, the electroconductive support may be a plastic on which a film of the metal or metal alloy as mentioned above is formed by vacuum vapor deposition the plastic including polyethylene, polypropylene, polyvinyl chloride, polyethylene terephthalate, acrylic resins, and the like); or may be a plastic or metal substrate which is coated with a mixture of electroconductive particles (such as carbon black particles, and silver particles) and a suitable binder; or otherwise may be a plastic or paper sheet impregnated with electroconductive particles.

The electroconductive support may be in a shape of a drum, a sheet, a belt, or the like, and is preferably formed in the most suitable shape for the electrophotographic apparatus to be employed.

The electrophotographic photosensitive member of the present invention in not only useful for electrophotographic copying machines but also useful for a variety of application fields of electrophotography including facsimiles, laser beam printers, CRT printers, LED printers, liquid crystal printers, laser engraving systems, and so forth.

FIG. 1 shows a schematic diagram of a transfer type electrophotographic apparatus employing the electrophotographic photosensitive member of the present invention.

In FIG. 1, a drum type photosensitive member 1 serves as an image carrier, being driven to rotate around the axis 1*a* in the arrow direction at a predetermined peripheral speed. The photosensitive member 1 is charged positively or negatively at the peripheral face uniformly during the rotation by an electrostatic charging means 2, and then exposed to image-exposure light L (e.g. slit exposure, laser beam-scanning exposure, etc.) at the exposure portion 3 with an image-exposure means (not shown in the figure), whereby electrostatic latent images are sequentially formed on the peripheral surface in accordance with the exposed image.

The electrostatic latent image is developed with a toner by a developing means 4, and the toner-developed images are sequentially transferred by a transfer means 5 onto a surface of a transfer-receiving material P which is fed between the photosensitive member I and the transfer means 5 synchronously with the rotation of the photosensitive member 1 from a transfer-receiving material feeder not shown in the figure.

The transfer-receiving material P having received the transferred image is separated from the photosensitive member surface, and introduced to an image fixing means 8 for fixation of the image and sent out from the copying machine as a copy.

The surface of the photosensitive member 1, after the image transfer, is cleaned with a cleaning means 6 to remove any residual un-transferred toner, and is treated for charge-elimination with a pre-exposure means 7 for repeated use for image formation.

The generally and usually employed charging means 2 for uniformly charging the photosensitive member 1 is a corona charging apparatus. The generally and usually employed transfer means 5 is also a corona charging means. In the electrophotographic apparatus, two or more of the constitutional elements of the above described photosensitive member, the developing means, the cleaning means, etc. may be integrated into one apparatus unit, which may be made demountable from the main body of the apparatus. For example, at least one of an electrostatic charging means, a developing means, and a cleaning means is combined with the photosensitive member into one unit demountable from the main body of the apparatus by aid of a guiding means such as a rail of the main body of the apparatus. A electrostatic charging means and/or a developing means may be combined with the aforementioned apparatus unit.

In the case where the electrophotographic apparatus is used as a copying machine or a printer, the optical image exposure light L is projected onto the photosensitive member as reflected light or transmitted light from an original copy, or alternatively the signalized information is read out by a sensor from an original copy and then scanning with a laser beam, driving an LED array, or driving a liquid crystal shutter array according to the signal onto, and the exposure light is projects a photosensitive member.

Figure 2:
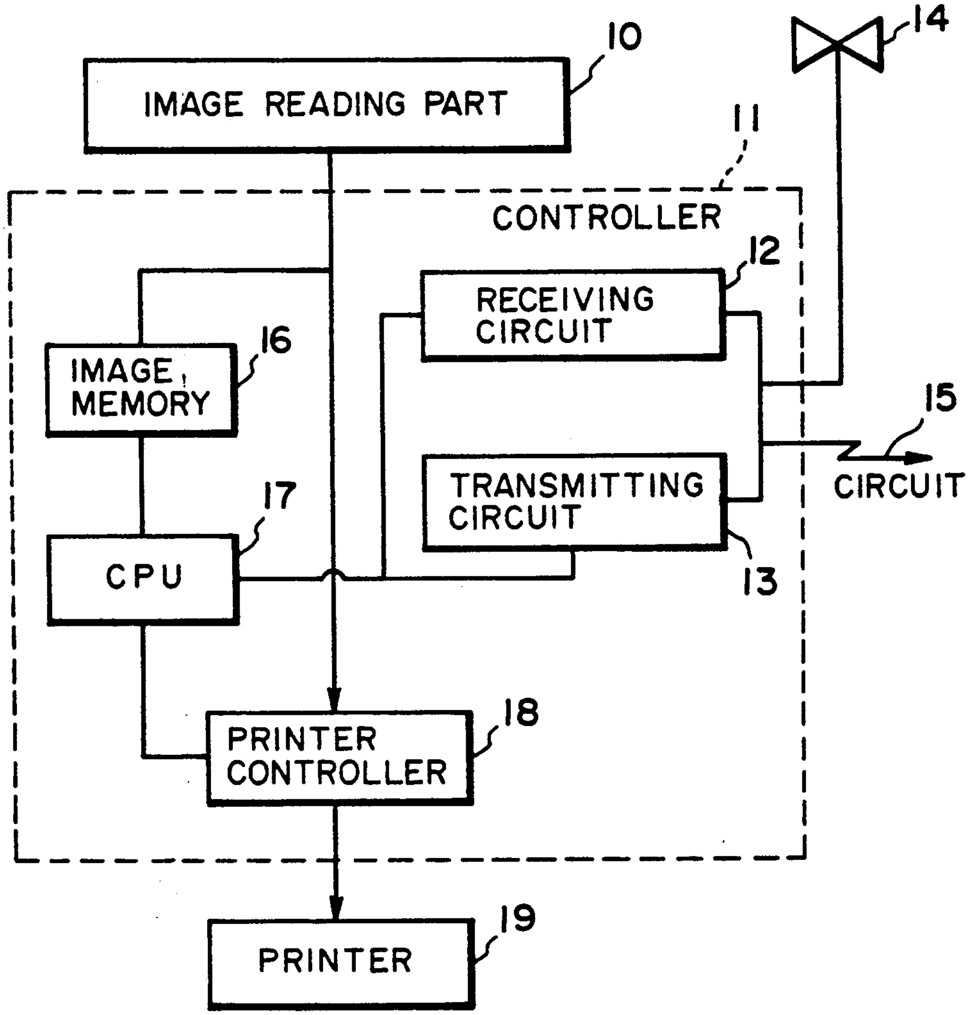
FIG. 2 illustrates an example of a block diagram of a facsimile employing the electrophotographic photosensitive member of the present invention.

In the case where the electrophotographic apparatus is used as a printer of a facsimile apparatus, the optical image exposure light L is for printing the received data. FIG. 2 is a block diagram of an example of this case.

A controller 11 controls an image reading part 10 and a printer 19. The whole of the controller 11 is controlled by a CPU 17. Readout data from the image reading part is transmitted through a transmitting circuit 13 to the other communication station. Data received from the other communication station is transmitted through a receiving circuit 12 to a printer 19. The image data is stored in image memory. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images are recorded in such a manner that the CPU 17 reads out the one page of image information, and sends out the decoded one page of image information to the printer controller 18, which controls the printer 19 on receiving the one page of image information from CPU 17 to record the image information.

Incidentally the CPU 17 receives the following page of information while recording is conducted by the printer 19.

Images are received and recorded in the manner as described above.

The present invention is described in more detail by reference to examples.

EXAMPLE 1

Onto an aluminum substrate, a solution of 5 g of methoxymethylated nylon (weight-average molecular weight: 32,000) and 10 g of alcohol-soluble copolymer nylon (weight-average molecular weight: 29,000) in 95 g of methanol was applied with a Meyer bar to form a subbing layer of 1 μm in dry thickness.

Separately, 5 g of Exemplified pigment (2) was added to a solution of 2 g of a butyral resin (butyralization degree: 63 mol%) in 95 g of cyclohexanone, and was dispersed for 20 hours by means of a sand mill. The resulting dispersion was applied and dried on the subbing layer having been formed as above with a Meyer bar to give a charge-generating layer of 0.3 μm in dry thickness.

Subsequently, 5 g of the hydrazone compound represented by the formula below:

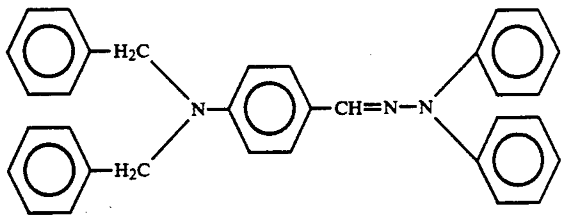

and 10 g of polymethyl methacrylate resin (weight-average molecular weight: 75,000) were dissolved in 40 g of chlorobenzene. The solution was applied onto the above-mentioned charge-generating layer with a Meyer bar and dried to form a charge-transporting layer of 18 μm in dry thickness, thereby an electrophotographic photosensitive member being prepared.

The electrophotographic photosensitive member prepared thus was tested for charging characteristics by means of an electrostatic copying-paper tester (Model SP-428, made by Kawaguchi Denki K. K.) by subjecting the member to corona charge at −5 KV to be negatively charged, leaving it in the dark for 1 second, and exposing it to light of illuminance of 10 lux with halogen lamp.

The charging characteristics measured were the surface potential ($V_0$) immediately after the charging, and the quantity of light exposure ($E_{1/2}$) required for decay of the surface potential by half after 1 second of dark standing, namely sensitivity.

The results are shown in Table 1.

EXAMPLES 2-15

Electrophotographic photosensitive members were prepared and evaluated in the same manner as in Example 1 except that Exemplified pigments shown in Table 1 each were used in place of Exemplified pigment (2).

The results are shown in Table 1.

TABLE 1

| Example | Exemplified pigment | $V_0$ (−V) | $E_{1/2}$ (lux · sec) |
|---|---|---|---|
| 1 | (2) | 690 | 2.2 |
| 2 | (3) | 705 | 1.9 |
| 3 | (5) | 710 | 3.8 |
| 4 | (9) | 700 | 4.2 |
| 5 | (10) | 685 | 1.7 |
| 6 | (12) | 690 | 2.4 |
| 7 | (15) | 700 | 2.2 |
| 8 | (17) | 705 | 2.9 |
| 9 | (19) | 715 | 2.3 |
| 10 | (21) | 715 | 2.9 |
| 11 | (25) | 705 | 3.6 |
| 12 | (27) | 690 | 4.8 |
| 13 | (31) | 690 | 3.3 |
| 14 | (36) | 710 | 3.0 |
| 15 | (43) | 700 | 4.9 |

COMPARATIVE EXAMPLES 1 AND 2

Electrophotographic photosensitive members were prepared and evaluated for charging characteristics in the same manner as in Example 1 except that Comparative pigments (A) or (B) represented by the structural formulas below each were used in place of Exemplified pigment (2).

The results are shown in Table 2.

Comparative pigment (A)

-continued

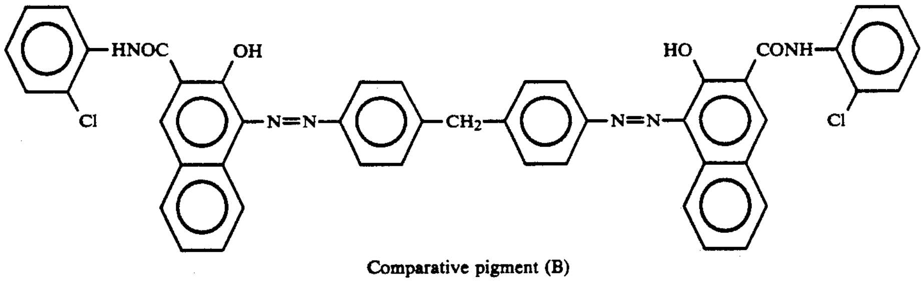

Comparative pigment (B)

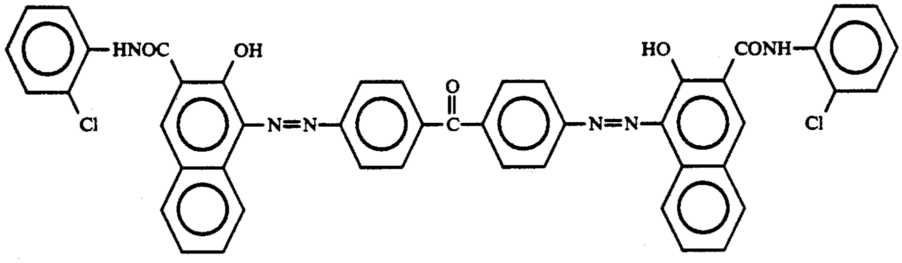

TABLE 2

| Comparative example | Comparative pigment | $V_0$ (−V) | $E_{1/2}$ (lux · sec) |
|---|---|---|---|
| 1 | (A) | 650 | 5.5 |
| 2 | (B) | 690 | 5.0 |

EXAMPLE 16-18

The electrophotographic photosensitive members prepared in Examples 1, 5, and 9 each were sticked onto a cylinder of an electrophotographic copying machine equipped with a −6.5 KV corona charger, a light-exposing system, a developer, a transfer-charger, a deelectrifying light-exposing system, and a cleaner.

With this copying machine, the dark portion potentials ($V_D$) and light portion potential ($V_L$) at the initial stage were set at approximately −700 V and −200 V, respectively, and the changes of the dark-portion potentials ($\Delta V_D$) and of the light-portion potentials ($\Delta V_L$) caused by 5000 times Of copying were measured to evaluate the durability characteristics.

The results are shown in Table 3, where the negative value of the change denotes the decrease of the absolute value of the potential and the positive value of the change denotes the increase thereof.

TABLE 3

| Example | $\Delta V_D$ (V) | $\Delta V_L$ (V) |
|---|---|---|
| 16 | −5 | 0 |
| 17 | 0 | +5 |
| 18 | −10 | +5 |

COMPARATIVE EXAMPLES 3 AND 4

The electrophotographic photosensitive members prepared in Comparative examples 1 and 2 were evaluated for durability characteristics by measuring the potential change in repeated use in the same manner as in Example 16. The results are shown in Table 4.

TABLE 4

| Comparative example | $\Delta V_D$ (V) | $\Delta V_L$ (V) |
|---|---|---|
| 3 | −70 | +50 |
| 4 | −55 | +90 |

EXAMPLE 19

On an aluminum face of an aluminum-vapor-deposited polyethylene terephthalate film, a subbing layer of polyvinyl alcohol of 0.3 μm thick was formed. Thereon, the dispersion of the disazo pigment employed in Example 2 was applied with a Meyer bar, and the applied layer was dried to give a charge-generating layer of 0.3 μm thick.

Subsequently, a solution of 5 g of the styryl compound of the formula below:

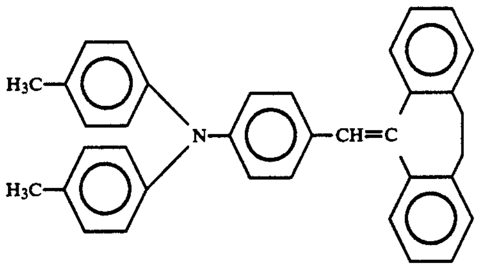

and 5 g of a polycarbonate resin (number-average molecular weight: 55,000) in 40 g of tetrahydrofuran was applied on the charge-generating layer, and was dried to form a charge-transporting layer of 18 μm thick, thereby an electrophotographic photosensitive member being prepared. The electrophotographic photosensitive member prepared thus was tested for the charging properties and durability characteristics in the same manners as in Example 1 and Example 16. The results are shown as below.

$V_0$: −710 V $E_{1/2}$: 2.3 lux.sec $\Delta V_D$: −10 V

ΔVL: +5 V

EXAMPLE 20

An electrophotographic photosensitive member was prepared in the same manner as in Example 5 except that the charge-generating layer and the charge-transporting layer were formed in the reversed order. The resulting electrophotographic photosensitive member was evaluated for charging characteristics in the same manner as in Example 1 but employing a positive charge potential:

$V_0$: +685 V $E_{1/2}$: 2.4 lux.sec

EXAMPLE 21

On the charge-generating layer prepared in Example 7, a solution of 5 g of 2,4,7-trinitro-9-fluorenone and 5 g of poly-4,4'-dioxydiphenyl-2,2-propane carbonate (number-average molecular weight: 300,000) in 50 g of tetrahydrofuran was applied with a Meyer bar and dried to give a charge-transporting layer of 19 μm thick, thereby an electrophotographic photosensitive member being prepared.

The charging characteristics of the resulting electrophotographic photosensitive member was evaluated in the same manner as in Example 1 but employing a positive charge potential.

$V_0$: +690 V $E_{1/2}$: 2.7 lux.sec

EXAMPLE 22

0.5 g of Exemplified pigment (2) was dispersed in 9.5 g of cyclohexanone by means of a paint shaker for 5 hours. Thereto, a solution of 5 g of the charge-transporting substance used in Example 1 and 5 g of the polycarbonate resin in 40 g of tetrahydrofuran was added, and the mixture was shaken further for one hour. The coating solution prepared thus was applied onto an aluminum substrate with a Meyer bar and was dried to form a photosensitive layer of 19 μm thick.

The electrophotographic photosensitive member prepared thus was evaluated for charging characteristics in the same manner as in Example 1 but employing positive charge potentials.

$V_0$: +700 V $E_{1/2}$: 2.3 lux.sec

What is claimed is:

1. An electrophotographic photosensitive member comprising an electroconductive support and a photosensitive layer formed thereon, said photosensitive layer comprising (a) a charge-generating layer containing a compound of the general formula (1) and a charge-transporting layer, or (b) a layer containing a compound of the general formula (1) and a charge-transporting substance, wherein the compound of the general formula (1) is represented below:

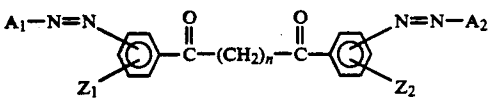

(1)

wherein $Z_1$ and $Z_2$ are each independently a hydrogen atom, an alkyl group, a halogen atom, an alkoxy group, a nitro group, a cyano group, or a trifuluromethyl group; $A_1$ and $A_2$ are each a coupler residue having a phenolic hydroxyl group, which may be the same or different; and n is an integer of 1 or 2.

2. An electrophotographic photosensitive member according to claim 1, wherein the group $A_1$ and the group $A_2$ are selected from the groups represented by the formulas (2) to (6):

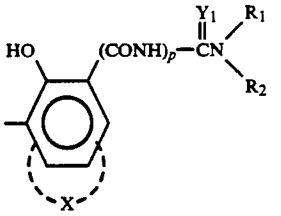

(2)

wherein X is a group of atoms for forming a substituted or unsubstituted polycyclic aromatic group or a substituted or unsubstituted heterocyclic group condensing with the benzene ring in the formula; $Y_1$ is an oxygen atom or a sulfur atom; $R_1$ and $R_2$ are each independently a hydrogen atom, a substituted or unsubstituted alkyl group, a substituted or unsubstituted aryl group, a substituted or unsubstituted aralkyl group, or a substituted or unsubstituted heterocyclic group, or may be linked together to form a cyclic amino group together with the nitrogen atom in the formula; and p is an integer of 0 or 1,

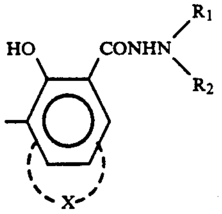

(3)

wherein X, $R_1$, and $R_2$ are he same as the above,

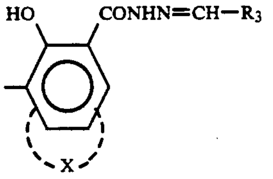

(4)

wherein X is the same as the above, and $R_3$ is a hydrogen atom, a substituted or unsubstituted alkyl group, a substituted or unsubstituted aryl group, a substituted or unsubstituted aralkyl group, or a substituted or unsubstituted heterocyclic group,

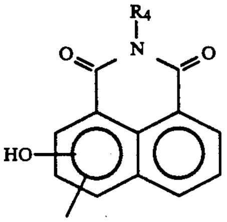

(5)

wherein $R_4$ is a hydrogen atom, a substituted or unsubstituted alkyl group, a substituted or unsubstituted aryl group, a substituted or unsubstituted aralkyl group, or a substituted or unsubstituted heterocyclic group,

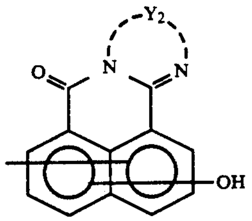

(6)

wherein $Y_2$ is an atomic group for forming a substituted or unsubstituted divalent aromatic hydrocarbon group or a substituted or unsubstituted divalent heterocyclic group having a nitrogen atom in the ring.

3. An electrophotographic photosensitive member according to claim 2, wherein the group $A_1$ and the group $A_2$ are selected from the groups represented by the formulas (2), (3), and (4).

4. An electrophotographic photosensitive member according to claim 2, wherein the group X is an atomic group for forming a benzocarbazole ring by condensing with the benzene ring in the formula.

5. An electrophotographic photosensitive member according to claim 2, wherein the group $A_1$ and the group $A_2$ are selected from the groups represented by the formulas (2), (3), and (4), and the group X is an atomic group for forming a benzocarbazole ring by condensing with the benzene ring in the formula.

6. An electrophotographic photosensitive member according to claim 1, wherein the photosensitive layer contains the compound of the formula (1) as a charge-generating substance.

7. An electrophotographic photosensitive member according to claim 1, wherein the photosensitive layer comprises a charge-generating layer and a charge-transporting layer.

8. An electrophotographic photosensitive member according to claim 7, herein the electrophotographic photosensitive member has an electroconductive support, a charge-generating layer formed thereon, and a charge-transporting layer formed further thereon.

9. An electrophotographic photosensitive member according to claim 7, wherein the electrophotographic photosensitive member has an electroconductive support, a charge-transporting layer formed thereon, and a charge-generating layer formed further thereon.

10. An electrophotographic photosensitive member according to claim 1, wherein the photosensitive layer is constituted of a single layer.

11. An electrophotographic photosensitive member according to claim 1, wherein the electrophotographic photosensitive member has a subbing layer between the electrophotographic support and the photosensitive layer.

12. An electrophotographic photosensitive member according to claim 1, wherein the electrophotographic photosensitive member has a protecting layer formed on he photosensitive layer.

13. An electrophotographic apparatus, comprising an electrophotographic photosensitive member, a means for forming an electrostatic latent image, a means for developing the electrostatic latent image formed, and a means for transferring a developed image onto a transfer-receiving material; said electrophotographic photosensitive member comprising an electroconductive support and a photosensitive layer formed thereon, said photosensitive layer comprising (a) a charge-generating layer containing a compound of the general formula (1) and a charge-transporting layer, or (b) a layer containing a compound of the general formula (1) and a charge-transporting substance, wherein the compound of the general formula (1) is represented below:

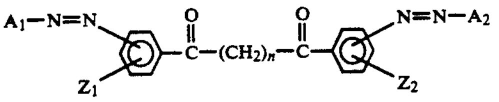

(1)

wherein $Z_1$ and $Z_2$ are each independently a hydrogen atom, an alkyl group, a halogen atom, an alkoxy group, a nitro group, a cyano group, or a trifluoromethyl group; $A_1$ and $A_2$ are each a coupler residue having a phenolic hydroxyl group, which may be the same or different; and n is an integer of 1 or 2.

14. An electrophotographic apparatus according to claim 13, wherein the group $A_1$ and the group $A_2$ are selected from the groups represented by the formulas (2) to (6):

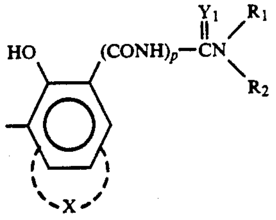

(2)

wherein X is a group of atoms for forming a substituted or unsubstituted polycyclic aromatic group or a substituted or unsubstituted heterocyclic group by condensing with the benzene ring in the formula; $Y_1$ is an oxygen atom or a sulfur atom; $R_1$ and $R_2$ are each independently a hydrogen atom, a substituted or unsubstituted alkyl group, a substituted or unsubstituted aryl group, a substituted or unsubstituted aralkyl group, or a substituted or unsubstituted heterocyclic group, or may be linked together to form a cyclic amino group together with the nitrogen atom in the formula; and p is an integer of 0 or 1,

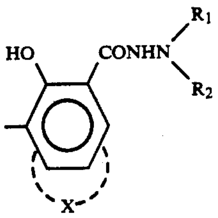

(3)

wherein X, $R_1$, and $R_2$ are the same as the above,

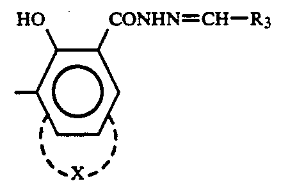

(4)

wherein X is the same as the above, and $R_3$ is a hydrogen atom, a substituted or unsubstituted alkyl group, a substituted or unsubstituted aryl group, a substituted or unsubstituted aralkyl group, or a substituted or unsubstituted heterocyclic group,

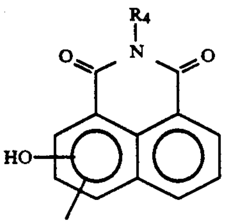

(5)

wherein $R_4$ is a hydrogen atom, a substituted or unsubstituted alkyl group, a substituted or unsubstituted aryl group, a substituted or unsubstituted aralkyl group, or a substituted or unsubstituted heterocyclic group,

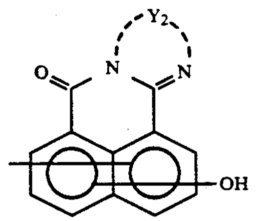

(6)

wherein $Y_2$ is an atomic group for forming a substituted or unsubstituted divalent aromatic hydrocarbon group or a substituted or unsubstituted divalent heterocyclic group having a nitrogen atom in the ring.

15. A device unit comprising an electrophotographic photosensitive member, a charging means, and a cleaning means;

said electrophotographic photosensitive member comprising an electroconductive support and a photosensitive layer formed thereon, said photosensitive layer comprising (a) a charge-generating layer containing a compound of the general formula (1) and a charge-transporting layer, or (b) a layer containing a compound of the general formula (1) and a charge-transporting substance, wherein the compound of the general formula (1) is represented below:

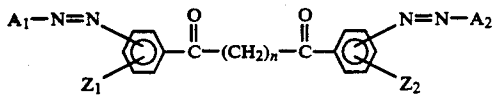

(1)

wherein $Z_1$ and $Z_2$ are each independently a hydrogen atom, an alkyl group, a halogen atom, an alkoxy group, a nitro group, a cyano group, or a trifluoromethyl group; $A_1$ and $A_2$ are each a coupler residue having a phenolic hydroxyl group, which may be the same or different; and n is an integer of 1 or 2;

wherein the electrophotographic photosensitive member, the charging means and the cleaning means of the device unit are integrated so as to be demountable from a main body of an electrophotographic apparatus as a single unit.

16. A device unit according to claim 15, wherein the group $A_1$ and the group $A_2$ are selected from the groups represented by the formulas (2) to (6):

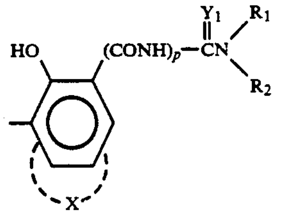

(2)

wherein X is a group of atoms for forming a substituted or unsubstituted polycyclic aromatic group or a substituted or unsubstituted heterocyclic group by condensing with the benzene ring in the formula; $Y_1$ is an oxygen atom or a sulfur atom; $R_1$ and $R_2$ are each independently a hydrogen atom, a substituted or unsubstituted alkyl group, a substituted or unsubstituted aryl group, a substituted or unsubstituted aralkyl group, or a substituted or unsubstituted heterocyclic group, or may be linked together to form a cyclic amino group together with the nitrogen atom in the formula; and p is an integer of 0 or 1,

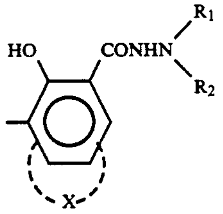

(3)

wherein X, $R_1$, and $R_2$ are the same as the above,

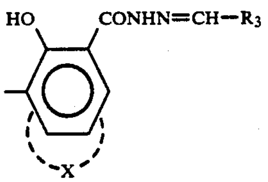

(4)

wherein X is the same as the above, and $R_3$ is a hydrogen atom, a substituted or unsubstituted alkyl group, a substituted or unsubstituted aryl group, a substituted or unsubstituted aralkyl group, or a substituted or unsubstituted heterocyclic group, (5)

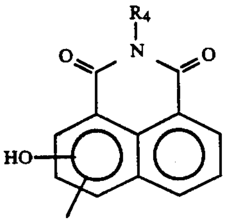

wherein $R_4$ is a hydrogen atom, a substituted or unsubstituted alkyl group, a substituted or unsubstituted aryl group, a substituted or unsubstituted aralkyl group, or a substituted or unsubstituted heterocyclic group, (6)

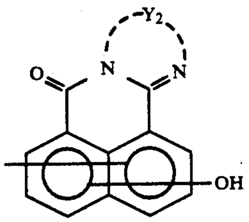

wherein $Y_2$ is an atomic group for forming a substituted or unsubstituted divalent aromatic hydrocarbon group or a substituted or unsubstituted divalent heterocyclic group having a nitrogen atom in the ring.

17. A device unit according to claim 15, wherein, the device unit comprises a developing means.

18. A facsimile machine, comprising an electrophotography apparatus and a signal-receiving means for receiving image information from a remote terminal:

said electrophotography apparatus comprising an electrophotographic photosensitive member, said electrophotographic photosensitive member comprising an electroconductive support and a photosensitive layer formed thereon, said photosensitive layer comprising (a) a charge-generating layer containing a compound of the general formula (1) and a charge-transporting layer, or (b) a layer containing a compound of the general formula (1) and a charge-transporting substance, wherein the compound of the general formula (1) is represented below:

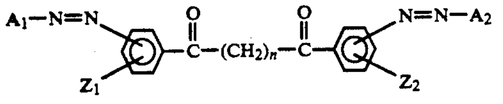

(1)

wherein $Z_1$ and $Z_2$ are each independently a hydrogen atom, an alkyl group, a halogen atom, an alkoxy group, a nitro group, a cyano group, or a trifluoromethyl group; $A_1$ and $A_2$ are each a coupler residue having a phenolic hydroxyl group, which may be the same or different; and n is an integer of 1 or 2.

19. A facsimile machine according to claim 18, wherein the group $A_1$ and the group $A_2$ are selected from the groups represented by the formulas (2) to (6):

(2)

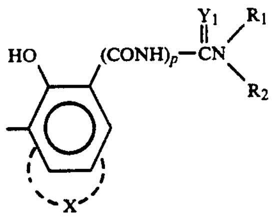

wherein X is a group of atoms for forming a substituted or unsubstituted polycyclic aromatic group or a substituted or unsubstituted heterocyclic group by condensing with the benzene ring in the formula; $Y_1$ is an oxygen atom or a sulfur atom; $R_1$ and $R_2$ are each independently a hydrogen atom, a substituted or unsubstituted alkyl group, a substituted or unsubstituted aryl group, a substituted or unsubstituted aralkyl group, or a substituted or unsubstituted heterocyclic group, or may be linked together to form a cyclic amino group together with the nitrogen atom in the formula; and p is an integer of 0 or 1, (3)

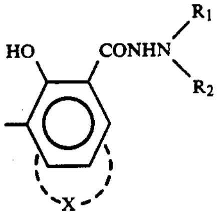

wherein X, $R_1$, and $R_2$ are the same as he above, (4)

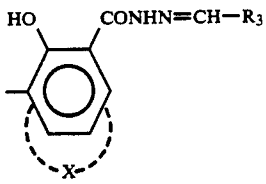

wherein X is the same as the above, and $R_3$ is a hydrogen atom, a substituted or unsubstituted alkyl group, a substituted or unsubstituted aryl group, a substituted or unsubstituted aralkyl group, or a substituted or unsubstituted heterocyclic group, (5)

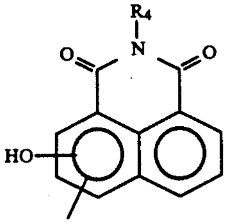

wherein $R_4$ is a hydrogen atom, a substituted or unsubstituted alkyl group, a substituted or unsubstituted aryl group, a substituted or unsubstituted aralkyl group, or a substituted or unsubstituted heterocyclic group,

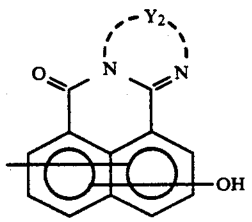
(6)
wherein $Y_2$ is an atomic group for forming a substituted or unsubstituted divalent aromatic hydrocarbon group or a substituted or unsubstituted divalent heterocyclic group having a nitrogen atom in the ring.
* * * * *

UNITED STATES PATENT AND TRADEMARK OFFICE
CERTIFICATE OF CORRECTION

PATENT NO. : 5,192,632

DATED : March 9, 1993

INVENTOR(S) : SATOMI OHMURA, ET AL.

It is certified that error appears in the above-identified patent and that said Letters Patent is hereby corrected as shown below:

COLUMN 1

Line 21, "-1 3,4-" should read -- -1,3,4- --.
Line 51, "61-21556," should read --61-215556,--.
Line 52, "an" should be deleted.
Line 53, "member" should read --members--.

COLUMN 3

Line 46, "4)" should read --(4)--.

COLUMN 4

Line 3, "Formula G)" should read --Formula (6)--.
Line 7, "naph-" should read --peri-naph- --.
Line 23, "The" should read --the--.
Line 46, "charge generating" should read --charge-generating--.

COLUMN 33

Line 6, "EXAMPLE Synthesis" should read --EXAMPLE ¶ Synthesis--.
Line 25, "mol" should read --mol)--.

COLUMN 34

Line 8, "Naturally" should read --Naturally,--.
Line 60, "electron attracting" should read --electron-attracting--.

UNITED STATES PATENT AND TRADEMARK OFFICE
CERTIFICATE OF CORRECTION

PATENT NO. : 5,192,632

DATED : March 9, 1993

INVENTOR(S) : SATOMI OHMURA, ET AL.

It is certified that error appears in the above-identified patent and that said Letters Patent is hereby corrected as shown below:

COLUMN 35

Line 42, "he" should read --the--.
Line 48, "polyamides" should read --polyamide--.
Line 64, "the" should read --(the--.

COLUMN 36

Line 35, "member I" should read --member 1--.
Line 46, "un-transferred" should read --untransferred--.
Line 63, "A" should read --An--.

COLUMN 37

Line 5, "scanning" should read --by scanning--.
Line 7, "signal onto" should read --input signal-- and "is projects a" should read --is projected onto a--.
Line 20, "image memory." should read --image memory 16.--.

COLUMN 39

Line 36, "EXAMPLE 16-18" should read --EXAMPLES 16-18--.
Line 48, "Of" should read --of--.

COLUMN 40

Line 68, "ΔVL: +5V" should read --$\Delta V_L$: +5V--.

COLUMN 41

Line 67, "trifuluromethyl" should read --trifluoromethyl--.

UNITED STATES PATENT AND TRADEMARK OFFICE

CERTIFICATE OF CORRECTION

PATENT NO. : 5,192,632

DATED : March 9, 1993

INVENTOR(S) : SATOMI OHMURA, ET AL.

It is certified that error appears in the above-identified patent and that said Letters Patent is hereby corrected as shown below:

COLUMN 42

Line 19, "condensing" should read --by condensing--.
Line 40, "he" should read --the--.

COLUMN 43

Line 41, "herein" should read --wherein--.
Line 61, "he" should read --the--.

COLUMN 47

Line 31, "wherein," should read --wherein--.

COLUMN 48

Line 36, "he" should read --the--.

Signed and Sealed this

First Day of March, 1994

Attest:

BRUCE LEHMAN

Attesting Officer

Commissioner of Patents and Trademarks